Patented June 25, 1940

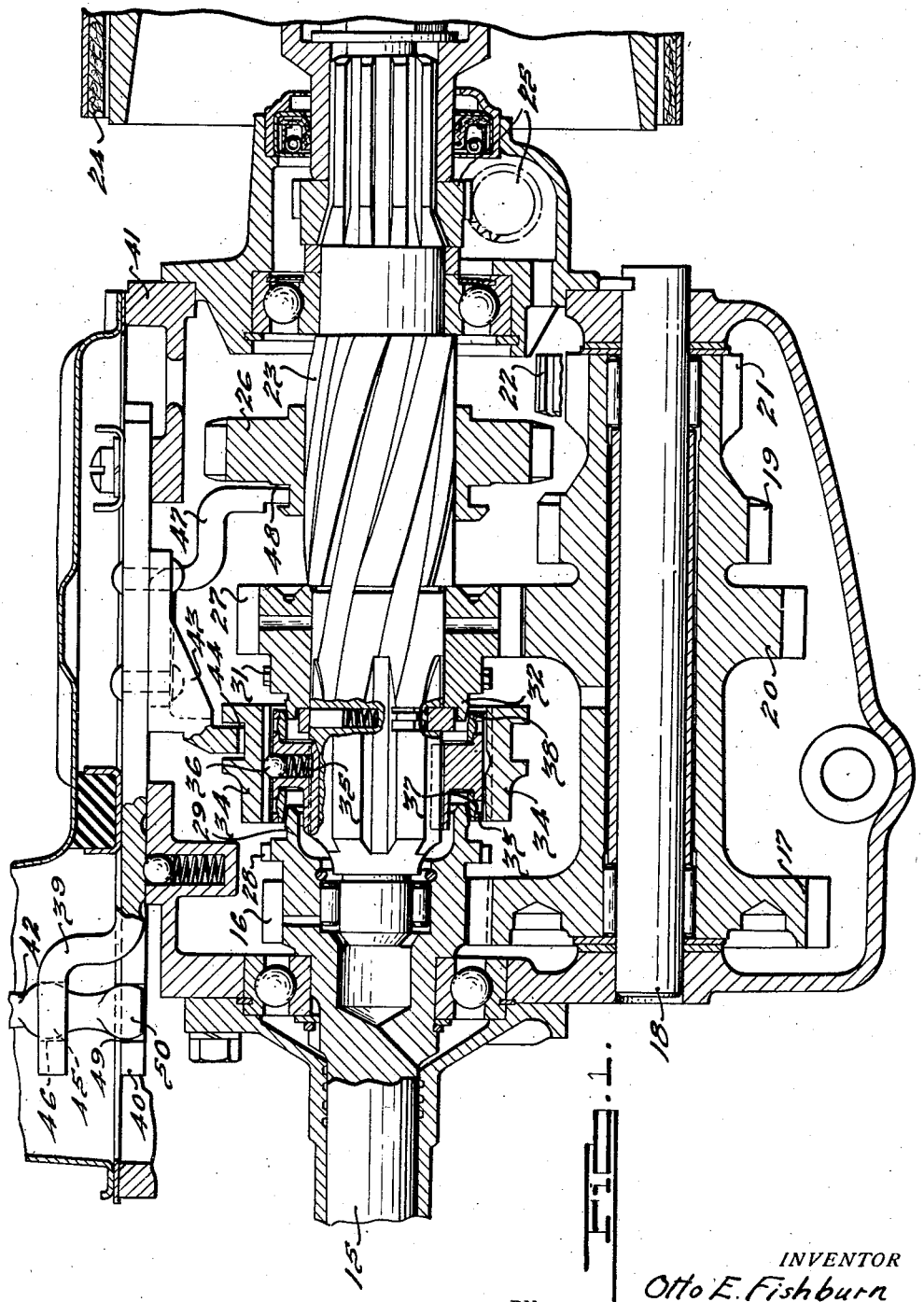

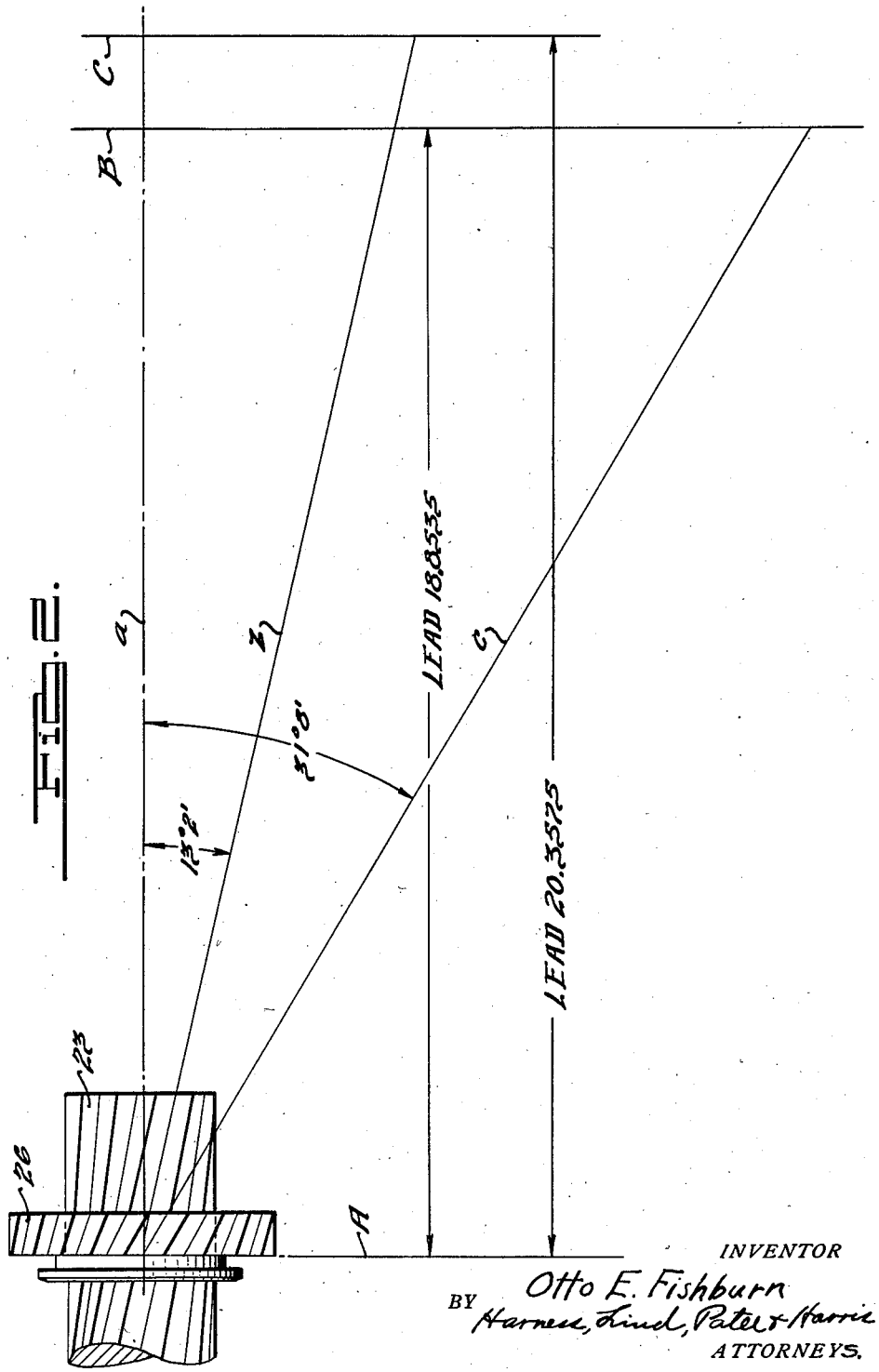

2,205,473

UNITED STATES PATENT OFFICE 2,205,473

POWER TRANSMISSION

Otto E. Fishburn, Detroit, Mich., assignor to Chrysler Corporation, Highland Park, Mich., a corporation of Delaware Application January 19, 1939, Serial No. 251,656

7 Claims. (Cl. 74—466)

This invention relates to improvements in variable speed transmission mechanisms and gearing therefor.

More particularly the invention pertains to gearing for transmissions of this kind which are particularly adapted for use in motor vehicles.

It is the principal object of the invention to provide a change speed transmission gearing in which the gears are easily shifted into and out of mesh and in which the shiftable gears have no tendency to slip out of engagement while running under load.

An additional object of the invention is to provide in a transmission mechanism means to compensate for the deflection of the shafts, gears and mountings caused by driving stresses imposed thereon while running under load, whereby a quieter and smoother transmission of power is achieved.

Difficulty has been experienced in the operation of change speed transmission mechanisms in motor vehicles because of the tendency of the low and reverse slidable gears to work out of mesh while running. In conventional transmission mechanisms the gears are formed with helical teeth for quietness and ease of shifting and the shiftable gears are mounted for sliding movement along a shaft, the driving connection between said shaft and gears being in the form of a helical spline. In order to promote ease of shifting, the helices of the gear teeth and spline shaft are usually cut in the same direction so that the slidable gear will be cammed into mesh with its mating gear when it is shifted under the influence of the shifter lever. To facilitate this action it is necessary that the helix of the gear teeth and the helix of the shaft spline be in "balance" and that the respective helix angles "agree." Two helices are in "balance" and the respective helix angles are in "agreement" when their "leads" are identical. The term "lead" may be defined as the axial linear distance from a given point on the helix to the adjacent point aligned therewith in a direction parallel to the axis of the helix.

For example, let it be assumed that a certain transmission is to have a gear having an outside diameter of 3.825 inches and a tooth helix angle of 31° 8' and that this gear is to be slidably mounted on a splined shaft having an outside diameter of 1.645 inches. A gear 3.825 inches in diameter with a tooth helix angle of 31° 8' will have a lead of 18.8535 inches. In other words, the gear will move axially a distance of 18.8535 inches while making a 360° revolution around the tooth helix. The shaft spline helix must then also have a lead of 18.8535 inches to balance the gear tooth helix and in this case the helix angle for a shaft 1.645 inches in diameter is 14° 2'. The helix of the gear teeth and shaft spline will then be in "balance", the respective helix angles will be in "agreement" and the gear will run in engagement with a meshing gear.

It has been found, however, that this theoretically correct relationship of parts will not give satisfactory results due to the fact that when running under load there is considerable deflection in the transmission gears as well as in the shafts, bearings, casing, etc. These deflections destroy the theoretically correct alignment of the parts and cause variations in the pressure between the meshing gear teeth and between the meshing splines on the gear hub and shaft. These variations in pressure produce pulsations and tend to cam the gears out of mesh and thereby break the drive. This disengaging tendency is especially troublesome (in conventional transmissions) when the vehicle is driven up hill in low gear because the weight of the gear accentuates the tendency for the gear to slide backwardly out of mesh.

In the present invention means is provided to compensate for the deflections in the parts referred to above and to eliminate the undesirable disengaging tendency of the gears. Briefly, this means consists in increasing the lead of the spline shaft helix over that of the gear tooth helix sufficiently to compensate for the misalignment of the parts due to the deflections referred to. In other words, the shaft spline helix is deliberately formed out of balance with the gear tooth helix in one direction and the amount of unbalance is just sufficient to compensate for the unbalance in the opposite direction caused by misalignment of the parts.

If, in the example given above, the helix angle of the shaft spline is decreased a slight amount, for example 1°, making it 13° 2' instead of 14° 2', an increase in the lead of the shaft spline from 18.8535 inches to 20.3575 inches is effected. It has been found that in the particular transmission under consideration this change is sufficient to compensate for the inherent deflections of the parts while running under load and that there is no tendency whatsoever for the slidable gear to disengage itself while driving.

For a specific embodiment of the invention, attention is directed to the accompanying drawings in which like reference characters designate corresponding parts in the following specification:

Fig. 1 is a sectional elevational view of a change speed transmission of a well-known type taken along the longitudinal axis thereof.

Fig. 2 is a diagrammatic view of the low-reverse shifter gear of the Fig. 1 transmission and its spline shaft.

Referring to the drawings, the invention is illustrated in connection with a motor vehicle transmission now in general use and in which is incorporated means for obtaining three forward driving speeds and one reverse driving speed, although I desire to point out that the improvements are applicable to other types of transmission mechanism. The conventional transmission illustrated in Fig. 1 comprises a driving shaft 15 which is adapted to be driven by the usual engine, preferably through the medium of the well-known main clutch, the engine and clutch not being illustrated in my drawings as they may be of any well-known form and arrangement such as now used in motor vehicles.

The driving shaft 15 carries the main driving gear 16 for rotation therewith, this gear being in constant mesh with the gear 17 of the countershaft gear cluster mounted for rotation on the countershaft 18. This gear cluster, according to well-known practice, comprises a low speed gear 19, a second speed gear 20 and a reverse gear 21 which is in constant mesh with the reverse idler gear 22. The transmission driven shaft 23 extends rearwardly to drive the ground wheels of the vehicle, the usual propeller shaft brake being illustrated at 24 and the speedometer driving gears being illustrated at 25.

The driven shaft 23 has mounted thereon the low speed and reverse gear 26 splined to the driven shaft for selective meshing with the countershaft low speed gear 19 or the reverse idler gear 22 for respectively transmitting a low speed drive to the driven shaft 23 or the drive thereto in a reversed direction. Freely rotatable on shaft 23 is the second speed gear 27 in constant mesh with the countershaft gear 20 for transmitting a second speed ratio drive as will be presently more apparent. The gear 16 drivingly carries a set of circumferentially spaced external clutch teeth 28 and one element of a synchronizing friction clutch 29. For convenience of manufacture it is preferable to form the clutch teeth 28 and clutch element 29 integrally with the body portion of the gear 16. In a similar manner the gear 27 drivingly carries a set of clutch teeth 31 and a synchronizing element 32.

Splined on the shaft 23 adjacent the forward extremity thereof is a hub 33 having splined thereon an axially shiftable collar or sleeve 34. The hub 33 is formed with a plurality of circumferentially spaced outwardly opening pockets each of which receives a spring as indicated at 35 yieldably urging a ball detent 36 outwardly into engagement with a registering recess in the inner periphery of the collar 34 for yieldably maintaining the collar and hub against relative axial movement. The hub 33 has axially oppositely extending portions 37 and 38 overlapping respectively the elements 29 and 32, each of the portions 37 and 38 having an inner peripheral surface corresponding to that of the adjacent overlapping portion.

The transmission is illustrated in its neutral position. To establish the direct driving connection between shafts 15 and 23, the collar 34 is shifted axially to the left as viewed in Fig. 1 by the control means hereinafter described, to engage the teeth 28 drivingly connected to the gear 16 carried by the driving shaft 15, and when so connected, the collar is also drivingly connected with the hub 33 which is in turn drivingly carried by the shaft 23. As the collar is thus shifted, the hub 33 is carried therewith, due to the ball detent connection between collar and hub, so that the overlapping portion 37 of the hub frictionally engages the synchronizing element 29 associated with gear 16 to synchronize the speeds of the shafts 15 and 13 prior to engagement of the collar 34 and teeth 28. When the element 29 and portion 37 are thus frictionally engaged, the detent connection between the hub and collar is broken and the latter continues axially to engage teeth 28 to establish the direct driving connection. The second speed driving connection is established by similarly moving the collar 34 to the right as viewed in Fig. 1 to engage teeth 31 formed integrally with gear 27, and when thus shifted, the overlapping portion 38 of the collar engages the element 32 to synchronize the speeds of the parts 31 and 32 to be clutched together, it being understood that the part 31 is being driven from the shaft 15 and the part 32 from the shaft 23.

The foregoing mechanism is a typical embodiment of a transmission and synchronizing means conventionally employed in motor vehicles. It will be understood, of course, that transmission mechanisms of the type illustrated operate in connection with a clutch (not shown) for controlling the drive from the usual engine to the shaft 15, and that the clutch is operated to release the drive to the shaft 15 prior to establishing the aforesaid driving connections.

The transmission drives are selectively controlled by a mechanism including a pair of longitudinally shiftable rails 39 and 40 supported by the transmission casing 41 and a rockably supported shifter lever 42. The rail 39 is adapted to selectively operate the collar 34 in the manner aforesaid to selectively establish the direct and second speed driving connections and for this purpose is provided with a yoke 43 engaged in an annular groove 44 in the periphery of the collar 34. In effecting the direct driving connection, the lever 42 is moved from its neutral position as shown to engage the enlarged portion 45 thereof in the notch 46 of the rail 39 and the lever is then rocked to effect movement of the rail 39 to the left as viewed in Figs. 1 and 2. For establishing the second speed driving connection, the lever 42 is similarly rocked to move the rail 39 in the opposite direction.

The rail 40 is adapted to selectively establish the low and reverse driving connections and for this purpose is provided with a yoke 47 engaged in an annular groove 48 formed in the hub of gear 26. The rail 40 has a notch 49 therein disposed opposite the notch 46 when the transmission is in a neutral position and the notch 49 is adapted to receive the enlarged end portion of the lever 42 whereby the rail is caused to be moved to the left as viewed in Figs. 1 and 2 to effect the low speed driving connection and is movable to the right to effect the reverse driving connection.

Fig. 2 shows a portion of the spline shaft 23 of the Fig. 1 transmission with the gear 26 mounted thereon. The angle between lines $a$ and $b$ represents the angle of the helical splines on shaft 23 and in this embodiment of the invention is 13° 2′. Gear 26 of course has complementary internal splines which engage the splines on shaft 23. The angle between lines $a$ and $c$ represents the angle of the tooth helix of gear 26 which in this embodiment of the invention is 31° 8'.

The linear distance in a direction parallel with the shaft and gear between lines A and B represents the lead of the gear tooth helix, in this case 18.8535 inches. The distance between lines A and C represents the lead of the spline shaft helix which in this case is 20.3575 inches.

It may thus be seen that a decrease of 1° in the spline shaft helix angle from its theoretically correct angle of 14° 2', necessary to agree with the helix angle of 31° 8' of the gear teeth, has produced an increase in the lead of 1.504 inches.

In most instances, a decrease of ¾° in the shaft spline helix angle (corresponding to a disagreement of approximately 6%) will be found sufficient to accomplish the desired result, although a greater or lesser deviation may be used where necessary, while in some instances a slight increase in the helix angle will give best results. In the case of a spur gear sliding on a shaft having a straight spline, any tendency for the gear to slide out of mesh under load may be eliminated by forming the spline teeth with a slight helical curve. It is desired to point out that the expression "helical gear" used in the following claims is intended to include gears having a helix angle of zero.

What I claim is:

1. In a power transmission comprising a pair of shafts and helical gears carried by said shafts, means for sliding one of said gears along its shaft to move it into and out of engagement with a meshing gear carried by the other of said shafts, said sliding gear being drivingly connected to its shaft by a helical spline, the lead of said spline helix differing from the lead of the helix of said sliding gear at no load by an amount equal to the change in lead caused by distortion of said shafts under load whereby tendency for the slidable gear to slide out of mesh under load is substantially eliminated.

2. In a power transmission comprising a pair of shafts and helical gears carried by said shafts, means for sliding one of said gears along its shafts to move it into and out of engagement with a meshing gear carried by the other of said shafts, said sliding gear being drivingly connected to its shaft by a helical spline, said gear helix being out of balance with said spline helix at no load by an amount equal to the unbalance caused by distortion of said shafts under load whereby tendency for the slidable gear to slide out of mesh under load is eliminated.

3. In a power transmission comprising a pair of shafts and helical gears carried by said shafts, means for sliding one of said gears along its shaft to move it into and out of engagement with a meshing gear carried by the other of said shafts, said sliding gear being drivingly connected to its shaft by a helical spline, the lead of said spline helix differing from the lead of said gear helix at no load by an amount sufficient to compensate for the change in lead caused by deflections in said shafts and gears while running under load.

4. In a power transmission comprising a pair of shafts and helical gears carried by said shafts, means for sliding one of said gears along its shaft to move it into and out of engagement with a meshing gear carried by the other of said shafts, said sliding gear being drivingly connected to its shaft by a helical spline, the helix angle of said gear teeth being out of agreement with the helix angle of said spline teeth at no load by approximately 6% whereby tendency for the slidable gear to slide out of mesh under load is substantially eliminated.

5. In a power transmission having meshable gears carried on spaced shafts and in which at least one of said gears is adapted to slide along a spline into and out of engagement with a meshing gear, the method of compensating for deflections in said shafts and gears tending to produce variations in the contact pressure between the teeth of said meshing gears while driving, consisting in providing an unbalance between the gear tooth curve and the spline tooth curve sufficient to compensate for the unbalance therebetween caused by said load deflections whereby said pressure variations are nullified.

6. In a power transmission of the selective gear type having members subject to load deflection, a rotatable drive gear; a spline shaft; a second drive gear slidably carried on said spline shaft and adapted for movement along said spline shaft into and out of mesh with said first gear; means for compensating for tendency of said gears to demesh caused by load deflection of said members which comprises forming the spline helix of the spline shaft out of balance with the toothed helix of the slidable gear by an amount sufficient to compensate for said load deflection whereby the said helices will be in substantial agreement when the parts are running under load.

7. In a power transmission having a drive gear, a spline shaft, and a gear slidable along said spline shaft and adapted to mesh with said drive gear, means for nullifying tendency of said slidable gear to slide out of mesh with said drive gear caused by load deflection of said shaft and gears, which comprises, providing said slidable gear with a tooth angle that is out of agreement with the spline angle of said spline shaft at no load by an amount substantially equal to the disagreement between said angles resulting from deflection of said shafts and gears under load conditions, whereby the two angles are substantially in agreement under normal load conditions.

OTTO E. FISHBURN.